US008734629B2

(12) United States Patent
Shenderov

(10) Patent No.: US 8,734,629 B2
(45) Date of Patent: *May 27, 2014

(54) DROPLET ACTUATOR AND METHODS

(75) Inventor: Alexander Shenderov, Raleigh, NC (US)

(73) Assignee: Advanced Liquid Logic, Inc., Research Triangle Park, NC (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/101,787

(22) Filed: May 5, 2011

(65) Prior Publication Data

US 2011/0209998 A1 Sep. 1, 2011

Related U.S. Application Data

(60) Continuation of application No. 11/833,576, filed on Aug. 3, 2007, now Pat. No. 7,943,030, which is a division of application No. 10/430,816, filed on May 6, 2003, now Pat. No. 7,255,780, which is a continuation of application No. 09/490,769, filed on Jan. 24, 2000, now Pat. No. 6,565,727.

(60) Provisional application No. 60/117,002, filed on Jan. 25, 1999.

(51) Int. Cl.
*G01N 27/447* (2006.01)
*G01N 27/453* (2006.01)

(52) U.S. Cl.
USPC .......................................... 204/450; 204/600

(58) Field of Classification Search
USPC ................. 204/600, 450, 547, 643, 409–412, 204/286.1
See application file for complete search history.

(56) References Cited

U.S. PATENT DOCUMENTS

| 3,479,141 | A | * | 11/1969 | Shamos et al. ................. 436/53 |
| 4,271,416 | A | * | 6/1981 | Shimizu et al. ................. 347/55 |
| 4,390,403 | A | | 6/1983 | Batchelder |
| 4,418,346 | A | | 11/1983 | Batchelder |
| 4,569,575 | A | | 2/1986 | Le Pesant et al. |
| 4,582,391 | A | | 4/1986 | Legrand |
| 4,636,785 | A | | 1/1987 | Le Pesant |

(Continued)

FOREIGN PATENT DOCUMENTS

| DE | 3808942 A1 | 9/1989 |
| DE | WO9316194 | 8/1993 |
| EP | 0676643 A | 10/1995 |
| FR | WO9015881 | 12/1990 |

OTHER PUBLICATIONS

Vijay Srinivasan, Vamsee K. Pamula, Richard B. Fair, "An integrated digital microfluidic lab-on-a-chip for clinical diagnostics on human physiological fluids," Lab on a Chip (LOC), vol. 4, pp. 310-315, 2004.

(Continued)

*Primary Examiner* — Alex Noguerola
(74) *Attorney, Agent, or Firm* — William A. Barrett; Ward & Smith, P.A.

(57) ABSTRACT

A series of microactuators for manipulating small quantities of liquids, and methods of using these for manipulating liquids, are disclosed. The microactuators are based on the phenomenon of electrowetting and contain no moving parts. The force acting on the liquid is a potential-dependent gradient of adhesion energy between the liquid and a solid insulating surface.

36 Claims, 5 Drawing Sheets

(56) References Cited

U.S. PATENT DOCUMENTS

| | | | |
|---|---|---|---|
| 4,701,021 A | | 10/1987 | Le Pasant |
| 4,911,782 A | | 3/1990 | Brown |
| 5,142,909 A | * | 9/1992 | Baughman ............... 73/304 C |
| 5,181,016 A | | 1/1993 | Lee |
| 5,192,659 A | | 3/1993 | Simons |
| 5,276,125 A | | 1/1994 | Pedain et al. |
| 5,472,577 A | | 12/1995 | Porter et al. |
| 5,486,337 A | | 1/1996 | Ohkawa et al. |
| 5,503,803 A | | 4/1996 | Brown |
| 5,521,383 A | * | 5/1996 | Furukawa et al. ............ 250/324 |
| 5,525,493 A | | 6/1996 | Hornes et al. |
| 5,571,410 A | | 11/1996 | Swedberg et al. |
| 5,605,662 A | | 2/1997 | Heller et al. |
| 5,731,792 A | | 3/1998 | Sheridon |
| 5,734,454 A | * | 3/1998 | Omae et al. .................. 349/86 |
| 5,871,908 A | | 2/1999 | Henco et al. |
| 5,948,328 A | | 9/1999 | Fiedler et al. |
| 5,956,005 A | | 9/1999 | Sheridon |
| 5,980,719 A | | 11/1999 | Cherukuri et al. |
| 5,992,820 A | | 11/1999 | Fare et al. |
| 5,994,056 A | | 11/1999 | Higuchi |
| 6,130,098 A | | 10/2000 | Handique et al. |
| 6,171,785 B1 | | 1/2001 | Higuchi |
| 6,287,831 B1 | | 9/2001 | Tai et al. |
| 6,294,063 B1 | | 9/2001 | Becker et al. |
| 6,565,727 B1 | | 5/2003 | Shenderov |
| 7,943,030 B2 | * | 5/2011 | Shenderov .................. 204/600 |

OTHER PUBLICATIONS

Colgate E, Matsumoto H, "An Investigation of Electrowetting-based Microactuation," Journal of Vacuum Science & Technology A-Vacuume Surfaces and Films, V. 8 (4): pp. 3625-3633, Jul.-Aug. 1990.

Kim Chang-Jin et al. Declaration under 37 CFR 1.131 with UCLA Invention Disclosure filed in U.S. Appl. No. 10/343,261, entitled Electrowetting-driven micropumping.

Kuzmin et al., Mol Gen Mikrobiol Virusol, 1991, vol. 8, pp. 6-8.

Masao Washizu, "Electrostatic Actuation of Liquid Droplets for Micro-Reactor Applications", IEEE Industry Applications Society Annual Meeting, pp. 1867-1873, Oct. 5-9, 1997.

Welters et al., "Fast Electrically Switchable Capillary Effects," Languwir, 14, pp. 1535-1538, 1998.

Wego, A., S. Richter, L. Pagel, "Fluidic microsystems based on printed circuit board technology," J. Micromech. Microeng., vol. 11, 2001, pp. 528-531.

Terry, S.C., J.H. Jerman, and J.B. Angell, "A Gas Chromatographic Air Analyzer Fabricated on a Silicon Wafer," IEEE Transactions on Electron Devices, vol. ED-26, 1979, pp. 1880-1886.

Tuckerman, D.B. and R.F.W. Pease, "High-Performance Heat Sinking for VLSI," IEEE Electron Device Letters, 1981, pp. 126-129.

Batchelder, J.S., "Dielectrophoretic manipulator," Review of Scientific Instruments, vol. 54, 1983, pp. 300-302.

Torkkeli, Altti, "Droplet microfluidics on a planar surface," Doctoral Dissertation, Department of Electrical Engineering, Helsinki University of Technology (Oct. 3, 2003).

Manz, A., N. Graber, and H.M. Widmer, "Miniaturized Total Chemical Analysis Systems: a Novel Concept for Chemical Sensing," Sensors and Actuators B: Chemical, 1990, pp. 244-248.

McDonald, J.C., D.C. Duffy, J.R. Anderson, D.T. Chiu, H. Wu, O.J.A. Schuueller, and G.M. Whitesides, "Fabrication of Microfluidic systems in poly (dimethylsiloxane)," Electrophoresis, vol. 21, 2000, pp. 27-40.

Moon, Hyejin, Ph.D., "Electrowetting-on-dielectric microfluidics: Modeling, physics, and MALDI application," Ph.D. Dissertation, University of California, Dept. of Mechanical Engineering, Los Angeles, 2006.

Pollack et al., "Electrowetting-Based Actuation of Droplets for Integrated Microfluidics," Lab on a Chip (LOC), vol. 2, pp. 96-101, 2002.

Office Action dated Jun. 28, 2001 from patented U.S. Appl. No. 09/490,769.

Response to Office Action dated Dec. 28, 2001 from patented U.S. Appl. No. 09/490,769.

Supplemental Response to Office Action dated Feb. 12, 2002 from patented U.S. Appl. No. 09/490,769.

Office Action dated Mar. 16, 2011 from patented U.S. Appl. No. 11/833,576.

Response to Office Action dated Mar. 18, 2011 from patented U.S. Appl. No. 11/833,576.

Berge, "Electrocopillariy and Wetting of Insulator Films by Water", C.R. Acad. Sci. Paris, 317, Sec 11, pp. 157-163, 1993.

Chen et al., "Development of Mesoscale Actuator Device with Micro Interlocking Mechanism", J. Intelligent Material Systems and Structures, vol. 9, No. 4, Jun. 1998, pp. 449-457.

Chen et al., "Mesoscale Actuator Device with Micro Interlocking Mechanism", Proc. IEEE Micro Electro Mechanical Systems Workshop, Heidelberg, Germany, Jan. 1998, pp. 384-389.

Jun et al., "Valveless Pumping using Traversing Vapor Bubbles in Microchannels", J. Applied Physics, vol. 83, No. 11, Jun. 1998, pp. 5658-5664.

Kim, "Microelectromechanical Systems (MEMS) at the UCLA Micromanufacturing Lab", Dig. Papers, Int. Microprocesses and Nanotechnology Conf. (MNC'98), Kyungju, Korea, Jul. 1998, pp. 54-55.

Lee et al., "Microactuation by Continuous Electrowetting Phenomenon and Silicon Deep Rie Process", Proc. MEMS (DSC—vol. 66) ASME Int. Mechanical Engineering Congress and Exposition, Anaheim, CA, Nov. 1998, 475-480.

Lee et al., "Liquid Micromotor Driven by Continuous Electrowetting", Proc. IEEE Micro Electro Mechanical Systems Workshop, Heidelberg, Germany, Jan. 1998, pp. 538-543.

Sherman et al., "In-Plane Microactuator for Fluid Control Application", Proc. IEEE Micro Electro Mechanical Systems Workshop, Heidelberg, Germany, Jan. 1998, pp. 454-459.

\* cited by examiner

DROPLET ACTUATOR AND METHODS

CROSS REFERENCES TO RELATED APPLICATIONS

This application is a continuation of U.S. patent application Ser. No. 11/833,576, filed Aug. 3, 2007, which is a divisional of U.S. patent application Ser. No. 10/430,816, filed May 6, 2003 (now U.S. Pat. No. 7,255,780), which is a continuation of U.S. patent application Ser. No. 09/490,769, filed Jan. 24, 2000 (now U.S. Pat. No. 6,565,727), which claims the benefit of provisional patent application No. 60/117,002, filed Jan. 25, 1999.

FIELD OF THE INVENTION

This invention relates generally to the fields of laboratory automation, microfabrication and manipulation of small volumes of fluids (microfluidics), in such a manner so as to enable rapid dispensing and manipulation of small isolated volumes of fluids under direct electronic control. More specifically, the invention relates to a method of forming and moving individual droplets of electrically conductive liquid, and devices for carrying out this method.

BACKGROUND OF THE INVENTION

Miniaturization of assays in analytical biochemistry is a direct result of the need to collect maximum data from a sample of a limited volume. This miniaturization, in turn, requires methods of rapid and automatic dispensing and manipulation of small volumes of liquids (solvents, reagents, samples etc.) The two methods currently employed for such manipulation are, 1) ink jetting and 2) electromigration methods in capillary channels: electroosmosis, electrophoresis and/or combination thereof. Both methods suffer poor reproducibility.

Ink jetting is based on dispensing droplets of liquid through a nozzle. Droplet expulsion from the nozzle is effected by a pressure pulse in the reservoir connected to the nozzle. The pressure pulse itself is effected by an electric signal. The droplets are subsequently deposited on a solid surface opposing the nozzle. The relative position of the nozzle and the surface is controlled by a mechanical device, resulting in deposition of droplets in a desired pattern. Removal of the droplets is typically effected by either washing or spinning (centrifugal forces).

While ink jetting is a dispensing method generally applicable to a wide variety of liquids, the volume of the deposited droplets is not very stable. It depends on both the nature of the liquid being deposited (viscosity, density, vapor pressure, surface tension) and the environment in the gap between the surface and the nozzle (temperature, humidity). Ink jetting technology does not provide means to manipulate droplets after they have been deposited on the surface, except for removing them.

Electromigration methods are based on mobility of ions in liquids when electric current is passed through the liquids. Because different ions have different mobilities in the electric field, the composition of liquid being manipulated generally changes as it is being transported. While this feature of electromigration methods is useful for analytical purposes, because it allows physical separation of components of mixtures, it is undesirable in general micromanipulation techniques.

Additionally, the need to pass electrical current through the liquid results in heating of the liquid, which may cause undesirable chemical reactions or even boiling. To avoid this, the electrical conductivities of all liquids in the system are kept low, limiting the applicability of electromigration methods.

The need to pass electrical current through the liquid also requires that the control electrodes be electrically connected through an uninterrupted body of conductive liquid. This requirement additionally complicates precision dispensing and results in ineffective use of reagents, because the metered doses of a liquid are isolated from a continuous flow of that liquid from one electrode to another.

Additionally, ions present in the liquid alter the electric field in that liquid. Therefore, changes in ionic composition in the liquid being manipulated result in variations in resultant distribution of flow and material for the same sequence of control electrical signals.

Finally, the devices for carrying out the electromigration methods have connected channels (capillaries), which are used to define liquid flow paths in the device. Because the sizes of these capillaries and connections among them are optimized for certain types of manipulations, and also for certain types of liquids, these devices are very specialized.

SUMMARY OF THE INVENTION

The present invention provides microchip laboratory systems and methods of using these systems so that complex chemical and biochemical procedures can be conducted on a microchip under electronic control. The microchip laboratory system comprises a material handling device that transports liquid in the form of individual droplets positioned between two substantially parallel, Hat surfaces. Optional devices for forming the droplets are also provided.

The formation and movement of droplets are precisely controlled by plurality of electric fields across the gap between the two surfaces. These fields are controlled by applying voltages to plurality of electrodes positioned on the opposite sides of the gap. The electrodes are substantially planar and positioned on the surfaces facing the gap. At least some of the electrodes are electrically insulated from the liquid in the gap.

The gap is filled with a filler fluid substantially immiscible with the liquids which are to be manipulated. The filler fluid is substantially non-conductive. The wetting properties of the surfaces facing inside the gap are controlled, by the choice of materials contacting the liquids or chemical modification of these materials, so that at least one of these surfaces is preferentially wettable by the filler fluid rather than any of the liquids which are to be manipulated.

The operating principle of the devices is known as electrowetting. If a droplet of polar conductive liquid is placed on a hydrophobic surface, application of electric potential across the liquid-solid interface reduces the contact angle, effectively converting the surface into more hydrophilic. According to the present invention, the electric fields effecting the hydrophobic-hydrophilic conversion are controlled by applying an electrical potential to electrodes arranged as an array on at least one side of the gap. The electrodes on the other side mayor may not be arranged in a similar array; in the preferred embodiment, there is array of electrodes only on one side of the gap, while the other has only one large electrode covering substantially the entire area of the device.

At least on one side of the gap, the electrodes are coated with an insulator. The insulator material is chosen so that it is chemically resistant to the liquids to be manipulated in the device, as well as the filler fluid. By applying an electrical potential to an electrode or a group of electrodes adjacent to an area contacted by polar liquid, the hydrophobic surface on top of these electrodes is converted to hydrophilic and the polar liquid is pulled by the surface tension gradient (Marangoni effect) so as to maximize the area overlap with the charged group of electrodes.

By removing an electric potential from an electrode positioned between the extremities of an elongated body of polar liquid, the portion of formerly hydrophilic surface corresponding to that electrode is made hydrophobic. The gradient of surface tension in this case acts to separate the elongated body of liquid into two separate bodies, each surrounded by a phase boundary. Thus, individual droplets of polar liquid can be formed by alternatively applying and removing an electric potential to electrodes. The droplets can be subsequently repositioned within the device as discussed above.

Examples of appropriate coating materials include SiN and BN, deposited by any of the conventional thin-film deposition methods (sputtering, evaporation, or preferably chemical vapor deposition) and Parylene™, deposited by pyrolytic process, spin-on glasses (SOGs) and polymer coatings (polyimides, polymethylmethacrylates and their copolymers, etc.), dipand spray-deposited polymer coatings, as well as polymer films (Teflon™, polyimides etc.) applied by lamination.

DETAILED DESCRIPTION OF THE INVENTION

Figure 1:
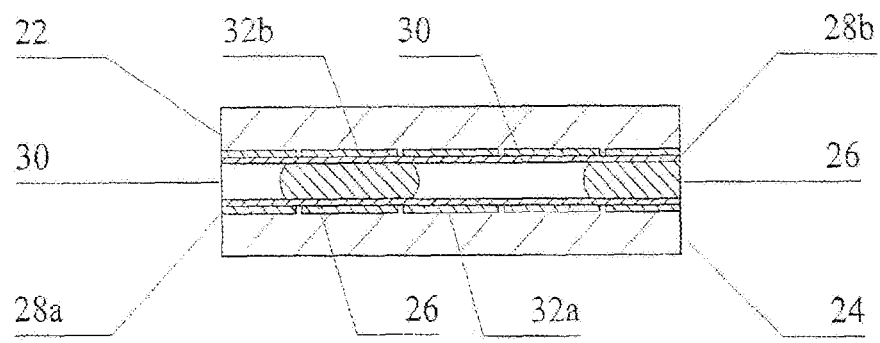
FIG. 1 Cross-section of a planar electrowetting actuator according to the invention
22—top wafer
24—bottom wafer
26—liquid droplet
28a—bottom hydrophobic insulating coating
28b—top hydrophobic insulating coating
30—filler fluid
32a—bottom control electrodes
32b—top control electrodes
  FIG. 2 Pump assembly
  FIG. 3 Drop meter
34—contact pad
36—cutoff electrode
  FIG. 4 Active reservoir
38—hydrophobic rim
40—reservoir electrodes
  FIG. 5 Array
42a—transport lines
42b—test areas
  FIG. 6 Vortexer
44—sectorial electrode
  FIG. 7 Zero-dead—volume valve
62—gate electrode
64a—first supply line
64b—second supply line
64c—common line
  FIG. 8 Decade dilutor
46—diluent line
48—reagent supply line
50—vortexer
52—undiluted reagent outlet
54—first stage outlet
56—second stage outlet
58—third stage outlet
60—fourth stage outlet

According to the invention, there is provided a chamber filled with a fluid, with flat electrodes 32a,b on opposite surfaces (FIG. 1). The chamber is formed by the top 22 and the bottom 24 wafers. The manipulated liquid is presented in the form of droplets 26. The fluid 30 filling the chamber should be immiscible with the liquid that is to be manipulated, and be less polar than that liquid. For example, if liquid 26 is an aqueous solution, the filling fluid 30 may be air, benzene, or a silicone oil. The electrodes have electrical connections allowing an outside control circuit to change their potentials individually or in groups. At least some of the electrodes have insulating, hydrophobic coating 28a,b separating them from the inside of the chamber, and the voltage is applied in such a manner that no DC voltage difference is applied to any two non-insulated electrodes.

EXAMPLE 1

A Pump

Figure 2:
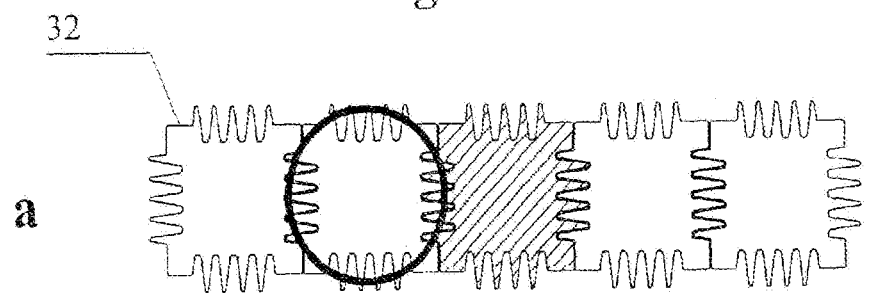
Figure 2:
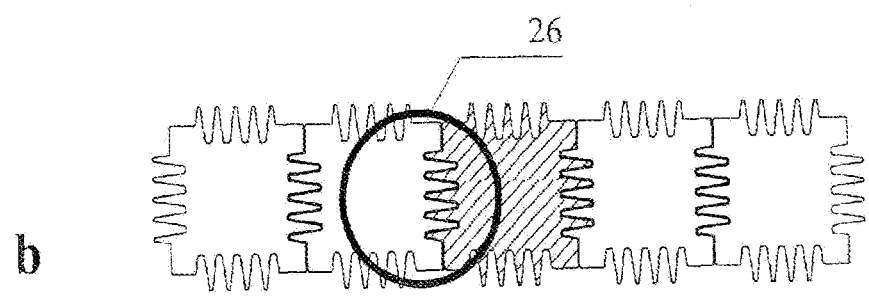
Figure 2:
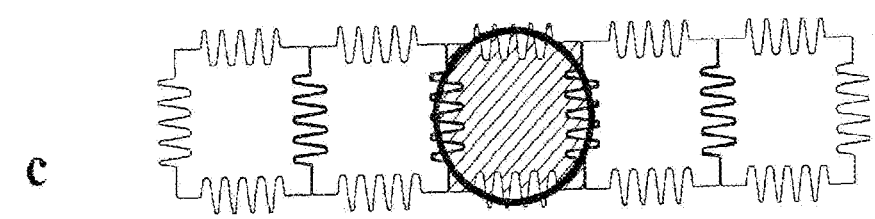

The linear arrangement of electrodes shown in FIG. 2 is an integral pump. A droplet of polar liquid, or a streak: of several electrode lengths, can be moved along by applying a wetting potential to an electrode on one side of it and removing the wetting potential from the last electrode under the other side of the streak: To aid the effect of electrowetting in moving liquid from one electrode to another, in a preferred embodiment the gap separating two adjacent electrodes is not straight. Preferably, it has either sawtooth or meander shape, preferably with rounded corners. The depths and widths of the interdigitated features of the-adjacent electrodes are preferably chosen so as to promote moving liquid from one electrode to another when the voltage is applied to the latter electrode, as shown in FIG. 2 a-c. The initial position of the droplet 26 is shown in FIG. 2a. The hatching of an electrode 32 adjacent to the position of the droplet indicates that that electrode is connected to a voltage source. The droplet 26 moves (FIG. 2b) so as to align itself with the electric field of that electrode (FIG. 2c).

EXAMPLE 2

A Drop Meter

As a convenient interface between a microfluidics device operating in subnanoliter to microliter range of volumes with the outside world, a drop meter is provided. The drop meter comprises an arrangement control pads on one side of the chamber (FIG. 3a). The contact pad 34 is either hydrophilic due to material it is made of, or due to a surface treatment, or made hydrophilic by applying a wetting potential to an underlying electrode. The other two control pads have electrodes under the hydrophobic surface.

Figure 3:
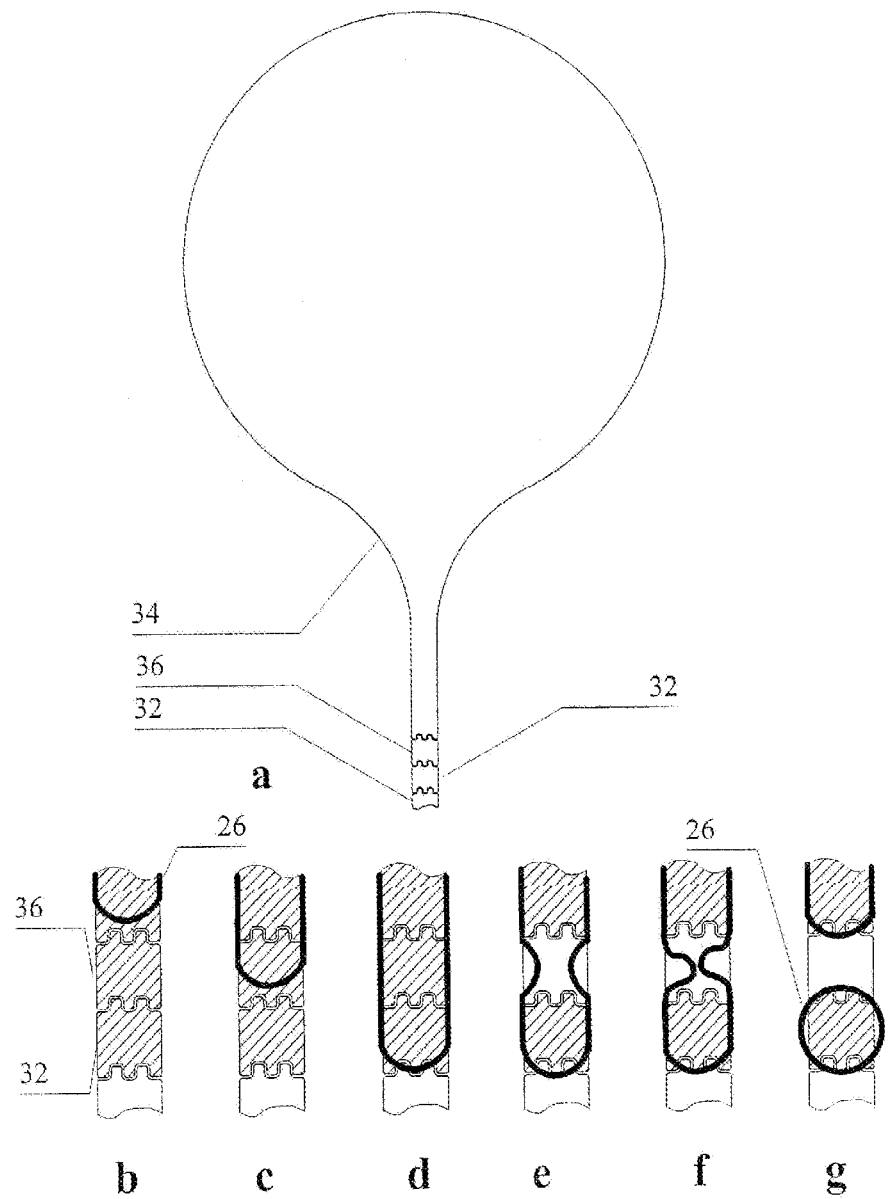

To operate the drop meter, a wetting potential is first applied to the cutoff electrode 36 and the control electrode 32. As a result of this, the liquid which has covered the surface of the contact pad 34 spreads over the other two pads, 32 and 36 (FIG. 3 b-d). Consequently, the wetting potential is removed from the cutoff electrode 36, making it hydrophobic again. Part of the liquid moves back to the contact pad 34, and is replaced on the cutoff electrode 36 with the filling fluid (FIG. 3 e-f). As a result, an isolated droplet of liquid (26, FIG. 3g) is formed on the control electrode 32. The size of the droplet is determined by the area of the control electrode 32 and the distance between the two surfaces forming the working chamber of the device.

EXAMPLE 3

An Active Reservoir

Figure 4:
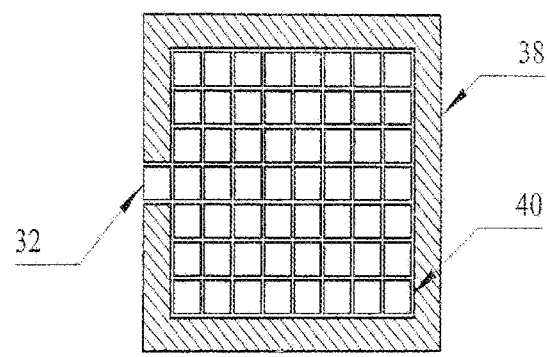

A reagent solution may be stored in an active reservoir in a sealed device and delivered under electronic control to a reaction site. An example of such reservoir is shown in FIG. 4. The delivery is effected by applying the wetting potential to the first electrode 32 of the transport line and removing the potential sequentially from the reservoir electrodes 40, for example beginning from the corner(s) furthermost from the transport line. To allow for long storage of the devices with power off, the coating within the reservoir area is only moderately hydrophobic, and the rim 38 around that area is extremely hydrophobic. The polar liquid will not spill beyond the rim 38, allowing long shelf life of the device.

EXAMPLE 4

An Array

Figure 8:
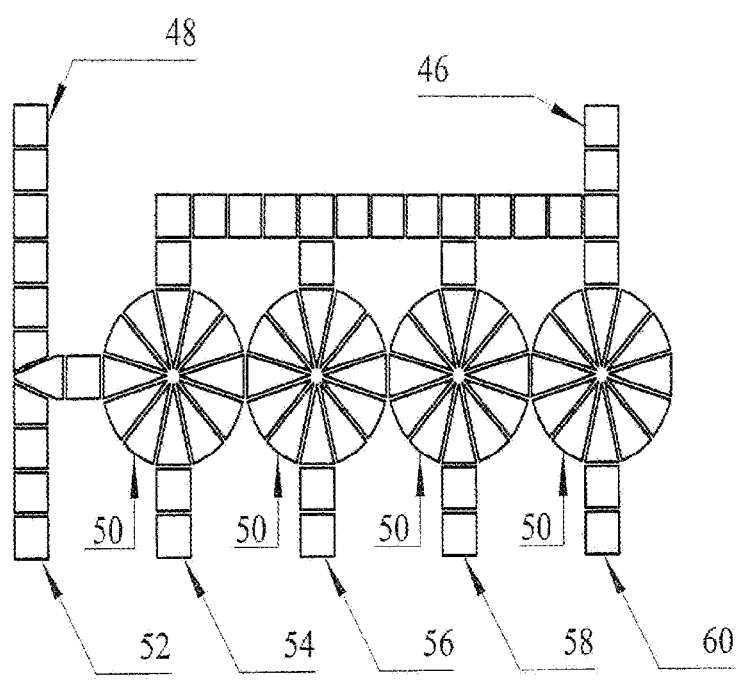

Droplets can be moved by electrowetting microactuators in more than one direction. The array shown in FIG. 5 comprises test areas 42b (hatched) and transport lines 42a (open). Reagents are supplied through external transport lines, shown (broken) in the top part of the drawing. Wash and waste lines are arranged similarly. The sources of the reagents may be reagent reservoirs as shown in FIG. 4, drop meters as in FIG. 3, or integral dilution devices such as shown in FIGS. 6,8. In a preferred embodiment, the test pad electrodes are transparent, for example made of indium tin oxide (ITO) or a thin, transparent metal film, to allow for optical detection of molecules immobilized on the pad or trapped in the droplet.

Such an array has utility as a system for parallel synthesis of many different reagents. Both solid-phase synthesis of immobilized compounds and liquid-phase synthesis using immobilized reagents, resins and catalysts are possible. Another use of such an array is a fraction collector for capillary electrophoresis or similar separation methods, whereby each fraction is isolated by a drop meter (similar to that shown in FIG. 3) and placed on its individual pad 32. This will allow long signal accumulation time for optical and radioactive detection methods and therefore improve sensitivity of analysis.

Important features of the electrodes in an array are the width of the gap between the electrodes and the shape of the electrode outline. To avoid accidental mixing of droplets on the test pads, the gaps separating those are straight and relatively wide. On the other hand, the electrodes in the transport lines preferably have interdigitated sawtooth or meander outlines. The gaps between the test pad electrodes and transport line electrodes are also preferably of the meander or sawtooth types.

EXAMPLE 5

A Mixer/Vortexer

For controlled mixing of solutions, an integral mixer/vortexer is provided (FIG. 6). It comprises a circular arrangement of sectorial electrodes 44, some of which have transport line electrodes adjacent to them. The necessary number of the sectors is filled with each solution to be mixed by consecutively applying the wetting potential to the respective electrodes. The sectors initially filled with different solutions are preferably isolated from each other by the interspersed sectors with filler fluid. Then the potentials on the transport lines are removed, and those on sectorial electrodes are rearranged so as to bring the solutions into contact. The mixing action is achieved by simultaneous removal of filler fluid from some of the sectors and filling other sectors with the filler fluid. In particular, vortexer action is achieved if this is done in a sequential fashion around the circle.

Alternative configurations of electrodes are possible for achieving the same goal of assisting in mixing solutions. For example, some of the sectors in an arrangement similar to that shown in FIG. 6 could be made narrower and longer than the other sectors.

EXAMPLE 6

A Zero-Dead-Volume Valve

To rapidly exchange solutions contacting a particular pad in an array, a zero-dead-volume valve is provided. An example of electrode configuration for this application is shown in FIG. 8. Supply lines 64a and 64b are connected to the line 64c through gate electrode 62. Either of the supply lines is operated in the manner described in Example 1, while wetting potential is applied to the gate electrode. Removal of the wetting potential from the gate electrode 62 allows to move one of the solutions back up its supply line before the other is transported down its respective line. This arrangement has utility, for example, in systems for determination of reaction kinetic constants.

EXAMPLE 7

A Decade Dilutor

A group of mixer/vortexers such as that shown in FIG. 6 can be used, complete with piping, for serial dilutions of reagents. An example of a decade dilutor with five decades is shown in FIG. 8. Each mixer in the decade dilutor is operated in the manner described in the Example 5. Undiluted solution is passed directly through to the line 52; diluted 10 times, down the line 54, and also to the next mixer 50; from there, solution diluted 100 times is passed both down the line 56 and to the next mixer 50 and so forth.

Figure 5:
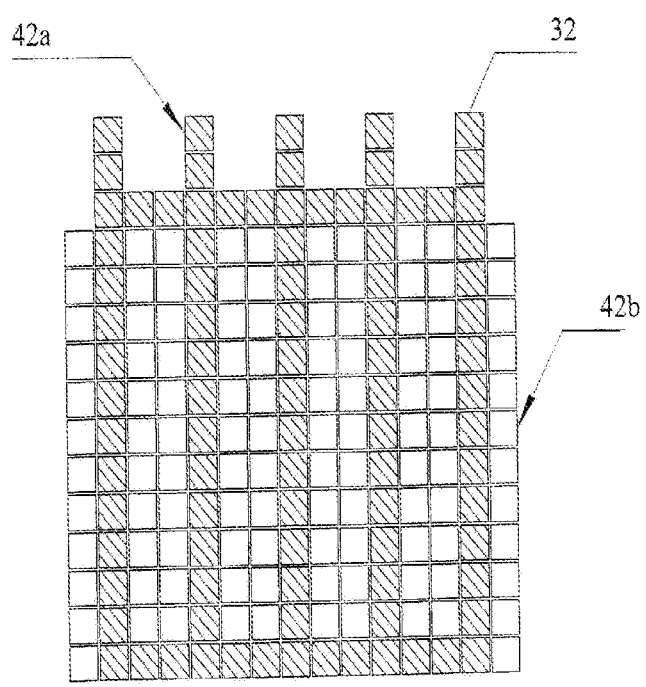
Figure 6:
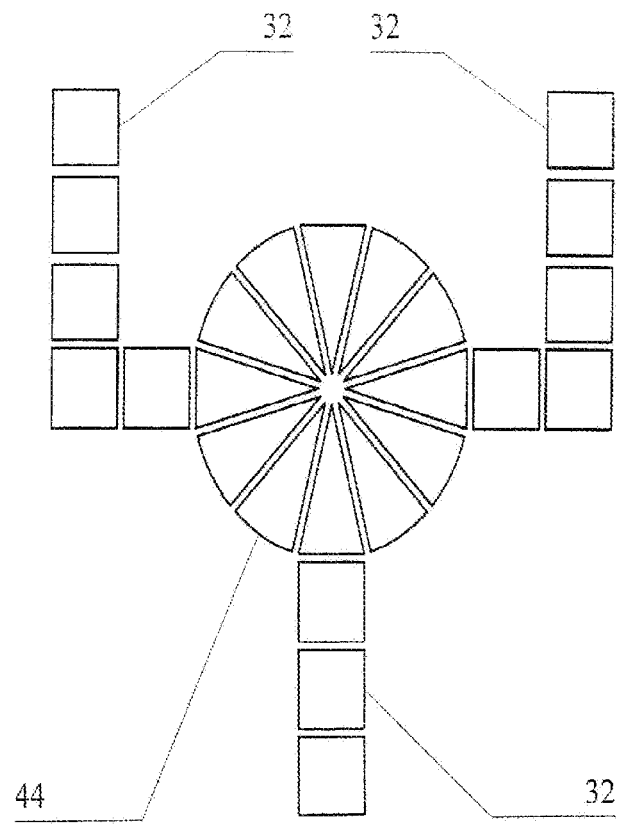
Figure 7:
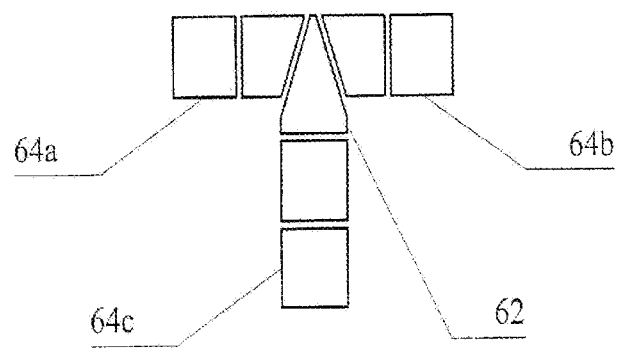

Such dilutors have utility, for example, as elements of a system for determination of binding constants of labeled reagents in solution to those immobilized on test pads of an array (similar to that shown in FIG. 5). While the present invention has been described in terms of particular embodiments, it should be understood that the present invention lies in the application of the electrowetting liquid propulsion principle to forming and manipulating discrete droplets of liquids rather than a particular structure or configuration of the device. It will be obvious to those skilled in the art that a variety of electrode configurations and arrangements can be substituted for those described in the Examples without departing from the scope of the present invention. In particular, the dimensions in the figures should be understood only as illustrative examples rather than set dimensions defining the scope of the present invention.

That which is claim is:
1. A device comprising:
(a) two surfaces separated to form a gap;
(b) a two-dimensional array and/or linear path of electrodes positioned to project an electric field across the gap;
(c) one or more electrodes exposed to the gap and not coated with an insulator material; and
wherein the electrodes comprise a hydrophobic surface.
2. The device of claim 1 wherein the gap is filled with a filler fluid and comprises one or more droplets in the filler fluid which are immiscible with the filler fluid.
3. The device of claim 2 wherein the filler fluid comprises a silicone oil.

4. The device of claim 1 wherein the two-dimensional array and/or linear path of electrodes comprise electrodes arranged to form a drop meter.

5. The device of claim 1 wherein at least a portion of the electrodes are electrically insulated from the liquid in the gap.

6. The device of claim 1 wherein electrodes of the two-dimensional array and/or linear path of electrodes comprise a hydrophobic insulating coating.

7. The device of claim 1 wherein the electrodes comprise an array of electrodes on the first surface and a single electrode on the second surface.

8. The device of claim 1 comprising the two-dimensional array of electrodes wherein the two-dimensional array comprises a plurality of gate electrodes which are electrically coupled together.

9. A method of forming a droplet, the method comprising:
   a. overlapping a droplet with a charged group of electrodes; wherein the charged group of electrodes is provided as a component of a device comprising:
      i. two surfaces separated to form a gap;
      ii. a two-dimensional array and/or linear path of electrodes positioned to project an electric field across the gap, the two-dimensional array and/or linear path of electrodes comprising the charged group of electrodes; and
      iii. one or more electrodes exposed to the gap and not coated with an insulator material; and
   b. removing a potential from an intermediate electrode of the charged group of electrodes to separate the droplet into separate bodies.

10. The method of claim 9 wherein the droplet comprises an elongated body overlapping the charged group of electrodes.

11. The method of claim 9 wherein the removing step comprises removing a potential from an electrode positioned between extremities of the elongated body.

12. The method of claim 9 wherein the overlapping step is accomplished by applying an electric potential to a group of electrodes to yield the charged group of electrodes.

13. The method of claim 9 wherein the charged group of electrodes comprises a polymer coating thereon.

14. The device of claim 9 wherein the gap is filled with a filler fluid and comprises one or more droplets in the filler fluid which are immiscible with the filler fluid.

15. The device of claim 14 wherein the filler fluid comprises a silicone oil.

16. The device of claim 14 wherein at least a portion of the electrodes are electrically insulated from the liquid in the gap.

17. The device of claim 9 wherein the two-dimensional array and/or linear path of electrodes comprise electrodes arranged to form a drop meter.

18. The device of claim 9 wherein the electrodes comprise a hydrophobic surface.

19. The device of claim 9 wherein electrodes of the two-dimensional array and/or linear path of electrodes comprise a hydrophobic insulating coating.

20. The device of claim 9 wherein the electrodes comprise an array of electrodes on one surface and a single electrode on the second surface.

21. The device of claim 9 comprising the two-dimensional array of electrodes wherein the two-dimensional array comprises a plurality of gate electrodes which are electrically coupled together.

22. A method of dispensing a droplet, the method comprising:
   a. providing substrate comprising a hydrophilic contact pad adjacent to a cutoff electrode adjacent to a control electrode;
   b. providing a liquid on the control pad;
   c. applying a wetting potential to the control pad, the cutoff electrode and the control electrode to spread the liquid over the control pad, the cutoff electrode and the control electrode; and
   d. removing the wetting potential from the cutoff electrode to yield a droplet on the control electrode.

23. The method of claim 22 wherein applying a wetting potential comprises applying an electric potential to yield a charged group of electrodes comprising the control pad, the cutoff electrode and the control electrode.

24. The method of claim 22 wherein the substrate is provided as a component of a device comprising:
   a. the substrate and a surface separated to form a gap;
   b. a two-dimensional array and/or linear path of electrodes positioned to project an electric field across the gap, the two-dimensional array and/or linear path of electrodes comprising the control pad, the cutoff electrode and the control electrode; and
   c. one or more electrodes exposed to the gap and not coated with an insulator material.

25. The device of claim 24 wherein the gap is filled with a filler fluid and comprises one or more droplets in the filler fluid which are immiscible with the filler fluid.

26. The device of claim 25 wherein the filler fluid comprises a silicone oil.

27. The device of claim 24 wherein the two-dimensional array and/or linear path of electrodes comprise electrodes arranged to form a drop meter.

28. The device of claim 24 wherein the electrodes comprise a hydrophobic surface.

29. The device of claim 24 wherein at least a portion of the electrodes are electrically insulated from the liquid in the gap.

30. The device of claim 24 wherein electrodes of the two-dimensional array and/or linear path of electrodes comprise a hydrophobic insulating coating.

31. The device of claim 24 wherein the electrodes comprise an array of electrodes on the first surface and a single electrode on the second surface.

32. The device of claim 24 comprising the two-dimensional array of electrodes wherein the two-dimensional array comprises a plurality of gate electrodes which are electrically coupled together.

33. A device comprising:
   a. two surfaces separated to form a gap;
   b. a two-dimensional array and/or linear path of electrodes positioned to project an electric field across the gap;
   c. one or more electrodes exposed to the gap and not coated with an insulator material; and
   wherein the two-dimensional array and/or linear path of electrodes comprise electrodes arranged to form a drop meter.

34. A device comprising:
   a. two surfaces separated to form a gap;
   b. a two-dimensional array and/or linear path of electrodes positioned to project an electric field across the gap;
   c. one or more electrodes exposed to the gap and not coated with an insulator material; and
   wherein at least a portion of the electrodes are electrically insulated from the liquid in the gap.

35. A device comprising:
   a. two surfaces separated to form a gap;
   b. a two-dimensional array and/or linear path of electrodes positioned to project an electric field across the gap;

c. one or more electrodes exposed to the gap and not coated with an insulator material; and wherein electrodes of the two-dimensional array and/or linear path of electrodes comprise a hydrophobic insulating coating.

36. A device comprising:

a. two surfaces separated to form a gap;

b. a two-dimensional array and/or linear path of electrodes positioned to project an electric field across the gap;

c. one or more electrodes exposed to the gap and not coated with an insulator material; and wherein the electrodes comprise an array of electrodes on the first surface and a single electrode on the second surface.

\* \* \* \* \*